United States Patent
Tajvidi et al.

(10) Patent No.: US 10,875,284 B2
(45) Date of Patent: Dec. 29, 2020

(54) COMPOSITE PRODUCTS OF PAPER AND CELLULOSE NANOFIBRILS AND PROCESS OF MAKING

(71) Applicant: University of Maine System Board of Trustees, Orono, ME (US)

(72) Inventors: Mehdi Tajvidi, Orono, ME (US); Douglas W. Bousfield, Glenburn, ME (US)

(73) Assignee: University of Maine System Board of Trustees, Orono, ME (US)

( * ) Notice: Subject to any disclaimer, the term of this patent is extended or adjusted under 35 U.S.C. 154(b) by 107 days.

(21) Appl. No.: 15/260,096

(22) Filed: Sep. 8, 2016

(65) Prior Publication Data

US 2017/0072670 A1 Mar. 16, 2017

Related U.S. Application Data

(60) Provisional application No. 62/216,660, filed on Sep. 10, 2015.

(51) Int. Cl.
*B32B 29/00* (2006.01)
*B32B 38/08* (2006.01)
(Continued)

(52) U.S. Cl.
CPC .............. *B32B 29/005* (2013.01); *B32B 7/04* (2013.01); *B32B 38/08* (2013.01); *D21H 11/18* (2013.01);
(Continued)

(58) Field of Classification Search
CPC ..... B32B 29/00; B32B 29/002; B32B 29/005; B32B 29/08
(Continued)

(56) References Cited

U.S. PATENT DOCUMENTS

| 2,822,855 A | * | 2/1958 | Sproull | ..................... B31F 1/36 156/184 |
| 3,682,734 A | * | 8/1972 | Burger | ................... D01G 25/00 156/166 |

(Continued)

FOREIGN PATENT DOCUMENTS

| EP | 2837736 A1 | 4/2013 |
| WO | 2008/138794 A1 | 11/2008 |

(Continued)

OTHER PUBLICATIONS

Biermann, Christoper, J., Handbook of Pulping and Papermaking, 1996, Elsevier, 2nd Ed., pp. 209-262. (Year: 1996).*

(Continued)

*Primary Examiner* — Matthew D Matzek
(74) *Attorney, Agent, or Firm* — MacMillan, Sobanski & Todd, LLC

(57) ABSTRACT

Strong, light-weight composite laminates are made by impregnating layers of paper with a cellulose nanofiber (CNF) slurry, laying the coated papers up in a plurality of layers or stack, and subjecting the stack to pressure and heat for a period of time sufficient to cause the CNF to impregnate, reinforce, and bond the paper layers into a composite. The resulting composite has impressive mechanical strength and exhibits a substantially homogeneous composition throughout its depth. The composite should have good strength to weight properties, and be recyclable or compostable.

13 Claims, 8 Drawing Sheets

(51) Int. Cl.
    *B32B 7/04* (2019.01)
    *D21H 11/18* (2006.01)
    *D21H 17/25* (2006.01)
    *D21H 27/30* (2006.01)
    *D21H 19/34* (2006.01)

(52) U.S. Cl.
    CPC .............. *D21H 17/25* (2013.01); *D21H 19/34* (2013.01); *D21H 27/30* (2013.01); *B32B 2250/05* (2013.01); *B32B 2250/26* (2013.01); *B32B 2260/023* (2013.01); *B32B 2260/028* (2013.01); *B32B 2260/04* (2013.01); *B32B 2262/062* (2013.01); *B32B 2307/54* (2013.01); *B32B 2307/546* (2013.01); *B32B 2307/7163* (2013.01); *B32B 2317/12* (2013.01); *B32B 2419/00* (2013.01); *B32B 2553/00* (2013.01); *B32B 2605/08* (2013.01); *B32B 2607/00* (2013.01)

(58) Field of Classification Search
    USPC ........ 428/535, 534; 162/123, 125, 129, 132, 162/131; 977/762; 442/412
    See application file for complete search history.

(56) References Cited

U.S. PATENT DOCUMENTS

| | | | | |
|---|---|---|---|---|
| 3,765,989 A | * | 10/1973 | Burger | ..................... D04H 1/74 156/441 |
| 4,290,988 A | * | 9/1981 | Nopper | ..................... B27N 3/04 264/112 |
| 6,207,362 B1 | * | 3/2001 | Dagan | ................... B41M 5/508 162/130 |
| 7,576,147 B2 | | 8/2009 | Drzal et al. | |
| 7,842,162 B1 | | 11/2010 | Lvov et al. | |
| 2012/0219816 A1 | * | 8/2012 | Heiskanen | ............. D21H 19/34 428/535 |
| 2015/0033983 A1 | | 2/2015 | Bilodeau et al. | |
| 2016/0032531 A1 | * | 2/2016 | Husband | ................ D21H 11/08 162/157.6 |

FOREIGN PATENT DOCUMENTS

| | | |
|---|---|---|
| WO | 2011/056135 A1 | 5/2011 |
| WO | 2013132017 A1 | 9/2013 |
| WO | 03/092972 A1 | 11/2013 |
| WO | 2014/140564 A1 | 9/2014 |
| WO | 2014/164127 A1 | 10/2014 |
| WO | 2015/033026 A1 | 3/2015 |

OTHER PUBLICATIONS

PCT International Search Report and Written Opinion, Application No. PCT/US2016/50855, dated Nov. 29, 2016.
Näslund, "Aspects of the Crystalline Utrastructure of Native Cellulosic Fibers", Royal Institute of Technology, (1987).
Tajvidi, "Cellulose Nanofibril Bound Laminated Paper Nonocomposites (Cellubound)", TAPPI International Conference on Nanotechnology for Renewable Materials 2015, (2015), vol. 1 of 2, pp. 144-157.
Extended European Search Report, Application No. 16845079.9, dated Apr. 3, 2019.

* cited by examiner

COMPOSITE PRODUCTS OF PAPER AND CELLULOSE NANOFIBRILS AND PROCESS OF MAKING

This application claim priority of provisional application 62/216,660, filed 10 Sep. 2015, which by this reference is incorporated herein in its entirety.

Some of this work was funded by the U.S. Department of Agriculture—Agricultural Research Service, and the US government may have some rights to this invention.

BACKGROUND OF THE INVENTION

The present invention relates generally to the field of cellulosic pulp processing, and more specifically to laminated composite products containing layers of paper bound with and impregnated by nanocellulose fibers.

Cellulose nanofibrils ("CNF") have been shown to be useful as a reinforcing material in wood and polymeric composites, as barrier coatings for paper, paperboard and other substrates, and as a paper-making additives to control porosity and bond dependent properties. For example, a review article by Siro I., and D. Plackett, "*Microfibrillated cellulose and new nanocomposite materials: a review*", Cellulose 17:459-494 (2010) discusses recent trends. Some research groups are looking at using nanocellulose fibers at low concentrations as reinforcements in plastic composites. In these cases, the prevalent thinking is that nanofibers can be used in combination with the polymeric binder in composites, typically as reinforcement, not as a replacement adhesive in lieu of the polymers. For example, Veigel S., J. Rathke, M. Weigl, W. Gindl-Altmutter, in "*Particle board and oriented strand board prepared with nanocellulose-reinforced adhesive*", J. of Nanomaterials, 2012, Article ID 158503 1-8, (2012) discuss using nanocellulose to reinforce the polymeric resins, but still retain resins in the system. Many of the other ideas by other groups are only using small volumes of fibers in high value products.

Since cellulose nanofibrils are generally produced in the form of aqueous slurries or suspensions, in some uses the fibrils must be dried prior to use at high energy cost. However, in wet applications, the CNF may be used without substantial drying, therefore realizing an energy savings. US Patent Publication 2015/0033983 to Bilodeau, et al., describes the use of nanocellulose fibers or CNF in the manufacture of certain building materials, such as wallboard, OSB, cements and paints. Here, the nanocellulose fibers act as a binder to hold together other structural elements such as wood particles or mineral pigments.

To applicants' knowledge, no workers have demonstrated the manufacture of strong, stiff, board-like products solely from paper and cellulose nanofibers.

SUMMARY OF THE INVENTION

In one aspect of this invention, a product incorporates cellulose nanofibers into composite laminated paper products, to produce a composite structure called Cellubound™. The nanofibers are homogeneously impregnated into the paper via impregnation, compression, and heat treatment steps, rather than merely adhering the paper layers together in striations or visible plies. Thus, an aspect of the invention includes a composite cellulosic product that comprises a plurality of layers of paper bonded together and reinforced by cellulose nanofibrils (CNF), wherein the CNF impregnates the paper layers and is distributed in a substantially homogeneous fashion. In fact, the paper and CNF material maybe the only materials that comprise the composite. No other binders are essential.

The composite product may have from about 1.0 to about 5.0 wt/wt % of dry CNF; and may exhibit a density from about 0.90 to about 1.3 $g/cm^3$, more typically from about 0.95 to about 1.2 $g/cm^3$. The composite product, though made from a plurality of layers, may be substantially homogeneous in final composition, the layers being impregnated and bonded, i.e. reinforced and adhered with the CNF. In fact, the ratio of actual layers or plies to make the composite divided by the number of apparent layers in the final product after compression is at least 4, sometimes 8, or 10 or more. Typically is it only the outer or surface layers—i.e. those in contact with a separation screen in the press—that retain any definition, and the interior plies merge into a more or less homogeneous matrix, with CNF impregnating the paper fibers.

In another aspect the invention comprises a method of making a composite described above. The method comprises: (1) contacting paper with a slurry containing from about 0.1 to about 3.0 wt/wt % CNF solids for a time sufficient to coat or impregnate the paper with the CNF in the slurry; (2) laying up a plurality of layers of the coated or impregnated papers to form a layer stack; and (3) subjecting the layer stack to a pressure and heat treatment to compress and dry the layer stack into a composite product.

The method may result in a substantially homogenous product that does not reveal the plies or layers from which it was formed. In some embodiments, the compression ranges from 1 to 10 minutes, for example from 3 to 7 minutes; and compression may be at elevated temperature from about 180° C. to about 220° C., optionally from about 190° C. to about 210° C.

In another aspect, the invention comprises an interlaminar reinforced paper product comprising a plurality of layers of paper bonded together and reinforced by cellulose nanofibrils (CNF), where the CNF both reinforces the paper layers and bonds the layers together, forming a substantially homogeneous composite product. In some embodiments, no other components—such as binders, adhesive, crosslinking agent, and the like—are required. In these embodiments, the interlaminar reinforced paper product consists of a plurality of layers of paper bonded together and reinforced only by cellulose nanofibrils (CNF), where the CNF both reinforces the paper layers and bonds the layers together, forming a substantially homogeneous composite product.

Some advantages of the invention include an eco-friendly or "green" material that is made from readily renewable resources (cellulose) and has a carbon neutral end of life disposal as it is 100% recyclable and biodegradable. It can be engineered to have orthotropic or anisotropic strength properties, depending on the manufacturing route; and the strength properties are as good as some plastic composite materials. It can easily be used as a strong, lightweight composite material in place of other composites in many applications, including applications such as automotive interior door panels or headliners, in the building industry, and in the packaging industry.

Other advantages and features are evident from the following detailed description.

BRIEF DESCRIPTION OF THE DRAWINGS

The accompanying drawings, incorporated herein and forming a part of the specification, illustrate the present invention in its several aspects and, together with the description, serve to explain the principles of the invention. In the drawings, the thickness of the lines, layers, and regions may be exaggerated for clarity.

Figure 1A:
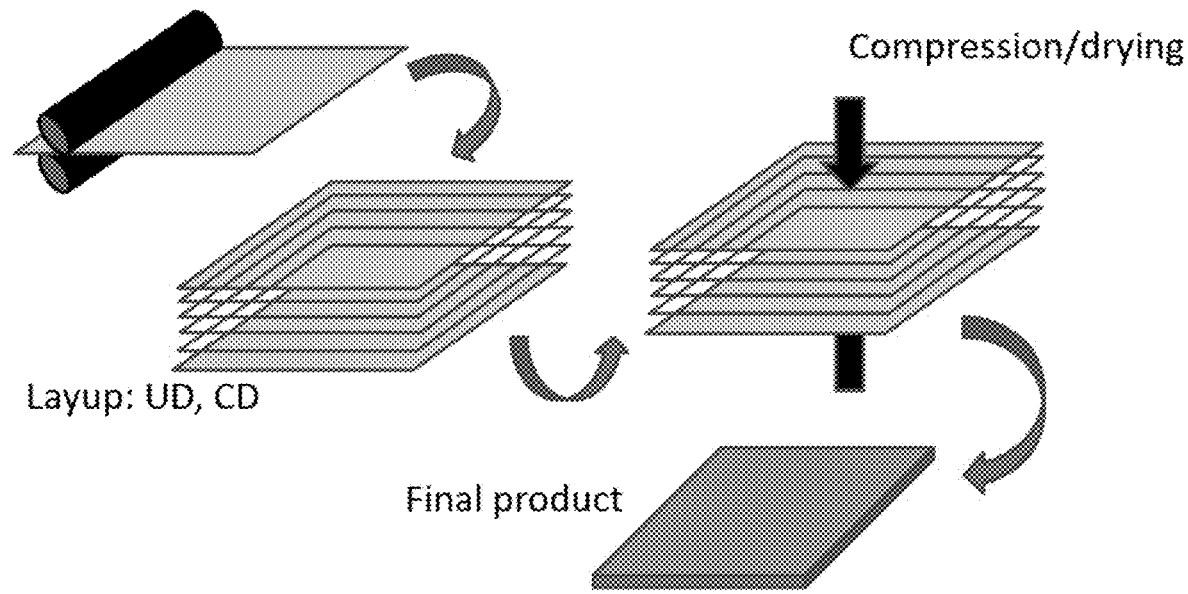
FIGS. 1A and 1B illustrate in general process of the invention; in more general form in FIG. 1A and more specific alternative embodiments in FIG. 1B.

Various aspects of this invention will become apparent to those skilled in the art from the following detailed description of the preferred embodiment, when read in light of the accompanying drawings.

DESCRIPTION OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including books, journal articles, published U.S. or foreign patent applications, issued U.S. or foreign patents, and any other references, are each incorporated by reference in their entireties, including all data, tables, figures, and text presented in the cited references.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless a context of mutual exclusivity clearly dictates otherwise.

Numerical ranges, measurements and parameters used to characterize the invention—for example, angular degrees, quantities of ingredients, polymer molecular weights, reaction conditions (pH, temperatures, charge levels, etc.), physical dimensions and so forth—are necessarily approximations; and, while reported as precisely as possible, they inherently contain imprecision derived from their respective measurements. Consequently, all numbers expressing ranges of magnitudes as used in the specification and claims are to be understood as being modified in all instances by the term "about." All numerical ranges are understood to include all possible incremental sub-ranges within the outer boundaries of the range. Thus, a range of 30 to 90 units discloses, for example, 35 to 50 units, 45 to 85 units, and 40 to 80 units, etc. Unless otherwise defined, percentages are wt/wt %.

General Pulping and CNF Production Processes

Wood and other cellulose-containing materials are converted to pulp for use in paper manufacturing. Pulp comprises fibers capable of being slurried or suspended and then deposited on a screen to form a sheet of paper. There are two main types of pulping techniques: mechanical pulping and chemical pulping. In mechanical pulping, the wood is physically separated into individual fibers. In chemical pulping, the wood chips are digested with chemical solutions to solubilize a portion of the lignin and thus permit its removal. The commonly used chemical pulping processes include: (a) the Kraft process, (b) the sulfite process, and (c) the soda process. These processes need not be described here as they are well described in the literature, including Smook, Gary A., Handbook for Pulp & Paper Technologists, Tappi Press, 1992 (especially Chapter 4), and the article: "Overview of the Wood Pulp Industry," Market Pulp Association, 2007. The kraft process is the most commonly used and involves digesting the wood chips in an aqueous solution of sodium hydroxide and sodium sulfide. The wood pulp produced in the pulping process is usually separated into a fibrous mass and washed. Such pulps may be formed into paper according to known methods that need not be described herein, and any such papers may form the plies of the composite according to the invention.

Although the invention is generally described in the context of wood fibers and wood cellulose as an example, any source of cellulosic material may be used to form the CNF useful in the invention. Other cellulosic materials include other plant materials such as grasses, straw, and corn stover, and other waste materials such as recycled paper or compost materials.

A generalized process for producing nanocellulose or fibrillated cellulose is disclosed in PCT Patent Application No. WO 2013/188,657, which is herein incorporated by reference in its entirety. The process includes a step in which the wood pulp is mechanically comminuted in any type of mill or device that grinds the fibers apart. Such mills are well known in the industry and include, without limitation, Valley beaters, single disk refiners, double disk refiners, conical refiners, including both wide angle and narrow angle, cylindrical refiners, homogenizers, microfluidizers, and other similar milling or grinding apparatus. These mechanical comminution devices need not be described in detail herein, since they are well described in the literature, for example, Smook, Gary A., Handbook for Pulp & Paper Technologists, Tappi Press, 1992 (especially Chapter 13). Tappi standard T200 describes a procedure for mechanical processing of pulp using a beater. The process of mechanical breakdown, regardless of instrument type, is generally referred to in the literature as "refining" (although generically it is a form of comminution), and produces a slurry of cellulose nanofibrils (CNF).

CNF are also known in the literature as microfibrillated cellulose (MCF), cellulose microfibrils (CMF), nanocellulose fibers (NCF), and nanofibrillated cellulose (NFC). Despite this variability of nomenclature in the literature, the present invention is applicable to any nano-dimension cellulosic fiber; and all these terms may be used essentially interchangeably in this disclosure. The NCF have at least one dimension (e.g. diameter) in the nanometer range (e.g. 1 to 99 nm), although fiber lengths may vary from 0.1 mm to as much as about 4.0 mm depending on the type of wood or plant used as a source and the degree of refining. Thus, the refining process controls, to some degree, the length and aspect ratio of CNF. In some embodiments, the "as refined" fiber length is from about 0.2 mm to about 0.5 mm. Fiber length is measured using industry standard testers, such as the TechPap Morphi Fiber Length Analyzer. Within limits, as the fiber is more refined, the percent fines increases and the fiber length decreases.

The extent of comminution may be monitored during the process by any of several means. Certain optical instruments can provide continuous data relating to the fiber length distributions and percent fines, either of which may be used to define endpoints for the comminution stage. Within limits, as the fiber is more refined, the % fines increases and the fiber length decreases. Fiber length is measured using industry standard testers, such as the TechPap Morphi Fiber Length Analyzer, which reads out a particular "average" fiber length. In some embodiments, the "as refined" fiber length is from about 0.1 mm to about 0.6 mm, or from about 0.2 mm to about 0.5 mm.

Refiner disc plates with certain dimensions tend to produce refining conditions characterized by low specific edge load (SEL), also known in the art as "brushing" refining, which tends to promote hydration and gelation of cellulose fibers. Other refiner disc plates tend to produce refining conditions characterized by high SEL, also known in the art as "cutting" refining, which tends to promote shortening of cellulose fibers. Either may be used according to the invention, so long as a slurry of nano-sized fibrils is produced.

CNF find utility in the paper and paperboard industry, as was the case with traditional pulp. However, their rigidity and strength properties have found myriad uses beyond the traditional papermaking. Cellulose nanofibers have a surface chemistry that is well understood and compatible with many existing systems; and they are commercially scalable. For example, CNF have previously been used to strengthen coatings, barriers and films. Composites and reinforcements, that might traditionally employ glass, mineral, ceramic or carbon fibers, may suitably employ CNF instead.

Process for Making Composites

A general process for manufacturing the composites is shown in FIG. 1A. Multiple plies of a selected paper are contacted with a suspension of CNF to impregnate the paper layers. The plies are then layered one atop another in a stack or laminate. The laminate may be unidirectional, cross directional, or angle directional as described below. The stack is then subjected to compression and heat to cause removal of water from the suspension and drying. The composite product is released from the press.

Paper may vary in weight or areal density from about 60 gsm (grams/square meter) to about 400 gsm, and may be coated or uncoated. Papers useful for lamination plies according to the invention include papers from about 60 gsm to about 200 gsm, or from about about 60 gsm to about 100 gsm, for example, standard copy paper at 75 gsm. Uncoated papers may have the advantage of being 100% recyclable.

Figure 1B:
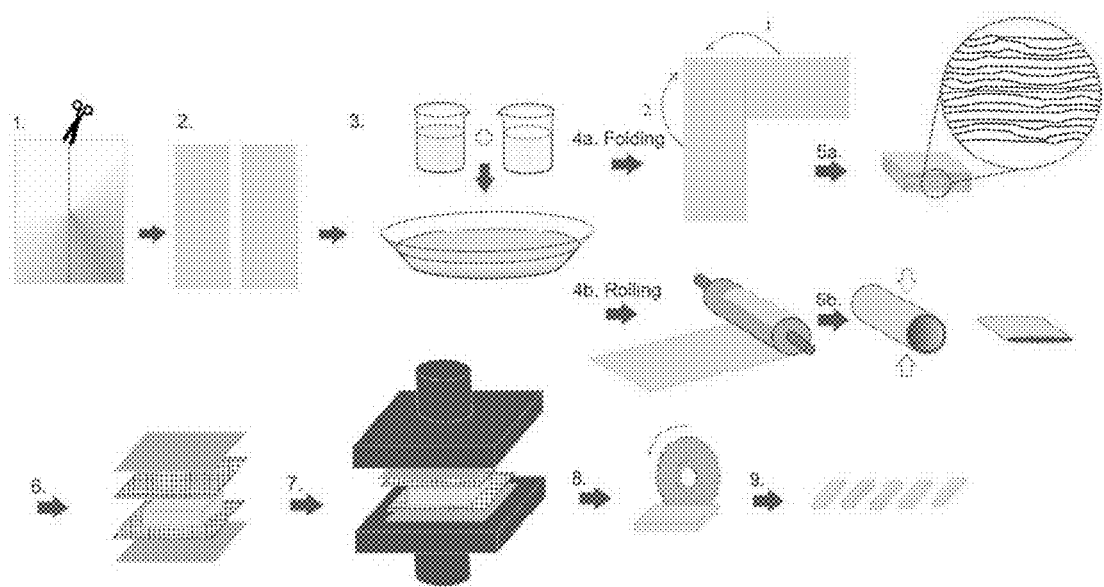

FIG. 1B illustrates the process at a somewhat more detailed level. Step 1 shows selection of a paper type for the plies. Selection of the paper type may contribute to the physical properties. It is well known that conventionally-made paper contains fibers that tend to predominantly align in the "machine direction" or MD, which is the direction of travel for a web of paper. This typically gives the underlying paper layers anisotropic properties, which change when measured in the MD direction compared to when measured in the "cross direction" or CD, which is generally perpendicular to MD. At step 2, the paper may be cut into strips, in which MD and CD directions are maintained.

At step 3, the paper strips are impregnated with CNF. Impregnating the paper may be done by many known contacting methods, including roller coating, sprayers, doctor blades, size presses, and immersion in a bath. In the slurries, the CNF content is expressed as percent solids. Exemplary concentrations may range from a minimum of about 0.1% up to about 3%; more typically from about 0.25% to about 1.5%; for example from about 0.3% to about 0.7%. Concentrated CNF suspensions may be diluted with water to form the correct concentration. In a bath immersion, the contact time for impregnation may vary from a few seconds (e.g. 5 seconds) to 5 minutes; typically from about 0.5 to 2 minutes, for example, for about 1 minute depending on the porosity of the base paper used.

Laying up the CNF-treated paper layers is done by laying one sheet of paper on top of another to form a stack. Cellubound™ composite paper products can be engineered with high stiffness and tensile strength, and can be made with isotropic (directionally uniform) physical properties, or anisotropic (directionally different) physical properties, as described below. The layup method may be used to retain and reinforce the underlying anisotropic properties of the paper, by layup in a unidirectional (UD) manner—i.e. laying each adjacent sheet such that the MD of one sheet is parallel to the MD of the next sheet. Laying up in the UD manner will produce an orthotropic product. Steps 4b and 5b illustrate this method by means of a Rectangular Round Beam (RRB) in which a the CNF-impregnated strip is rolled up into a cylindrical shape which is eventually collapsed and compressed in a hot press to form a UD laminate system.

Alternatively, the layup method may be used to reduce or negate the underlying anisotropic properties of the paper, by layup in an orthogonal cross direction (CD) manner—i.e. laying each adjacent sheet such that the MD of one sheet is perpendicular to the MD of the next sheet. This is shown in step 4a of FIG. 1B as a Cross Folding Technique (CFT), wherein the orthogonal strips are alternately folded back upon one another to form a CD stack or laminate system. Laying up in the CD manner will produce a plane isotropic product. A composite may also be made by forming a plurality of UD manner layups or stacks and alternating the UD stacks themselves in a UD or CD manner. Lastly, an angular layup method is also possible, with intermediate effect on isotropy.

The term "stack" or "laminate" as used herein refers to a plurality of sheets, layers, plies or laminae, all of which are used interchangeably, of paper coated or impregnated with a suspension of CNF. The number of layers or plies in a composite laminate may vary from as few as two to as many as a hundred or more, depending on the nature, thickness and density of desired final product. Excellent stiff laminated paper products have been made with from about 10 to about 50 plies, or from about 20 to about 40 plies. The densities (mass/volume) of such composite products have ranged from about 0.90 to about 1.3 $g/cm^3$, more typically from about 0.95 to about 1.2 $g/cm^3$, for example about 1.1 $g/cm^3$. The CNF content (wt/wt %) of such composite laminate products may range from about 1% to about 6%, or from about 2.5% to 3.5%, or around 3.2 to 3.4 as shown moisture analysis equipment and by gravimetric oven drying procedures.

The step of subjecting the laid up laminate to a pressure and heat treatment is also referred to herein as the "compression" step or as the "drying" step, or both and may be done in a press as shown at steps 6 and 7 of FIG. 1B. Pressure is applied by the upper and lower plates or surfaces that are planar if a flat, planar composite is desired. Alternatively, a contoured mold press might be used to shape the composite to a desired contour. A wire screen may be placed between the composite and the compression surface as shown at step 6 in order to facilitate separation after compression and enhance drying process.

Compression may be applied at pressures from about 1000 to about 1800 psi (about 6.9 to about 12.4 MPa), more typically from about 1200 to about 1600 psi (about 8.3 to about 11 MPa, for example from about 1300 to about 1500 psi (about 9 to about 10.3 MPa). The temperature during the compression or drying step may be raised to about 220° C., for example to a range from about 180° C. to about 210° C., or a range from about 170° C. to about 200° C. Any suitable heating method may be used, for example, a resistive heating element in the compression surface.

The compression and drying step may be maintained for a time from about 1 minute to about 10 minutes, depending on the desired product, more typically from about 3 minute to about 7 minutes. The point at which the CNF impregnates the paper layer may occur upon contact with the CNF suspension, or it may occur during the heat/compression step, or both. For this reason, the process step of "coating" a paper and a process step of "impregnating" a paper are deemed interchangeable, even if impregnation occurs during compression.

As shown at steps 8 and 9 of FIG. 1B, the composite laminate may be cut into strips or segments of any desired shape and dimension.

Figure 2:
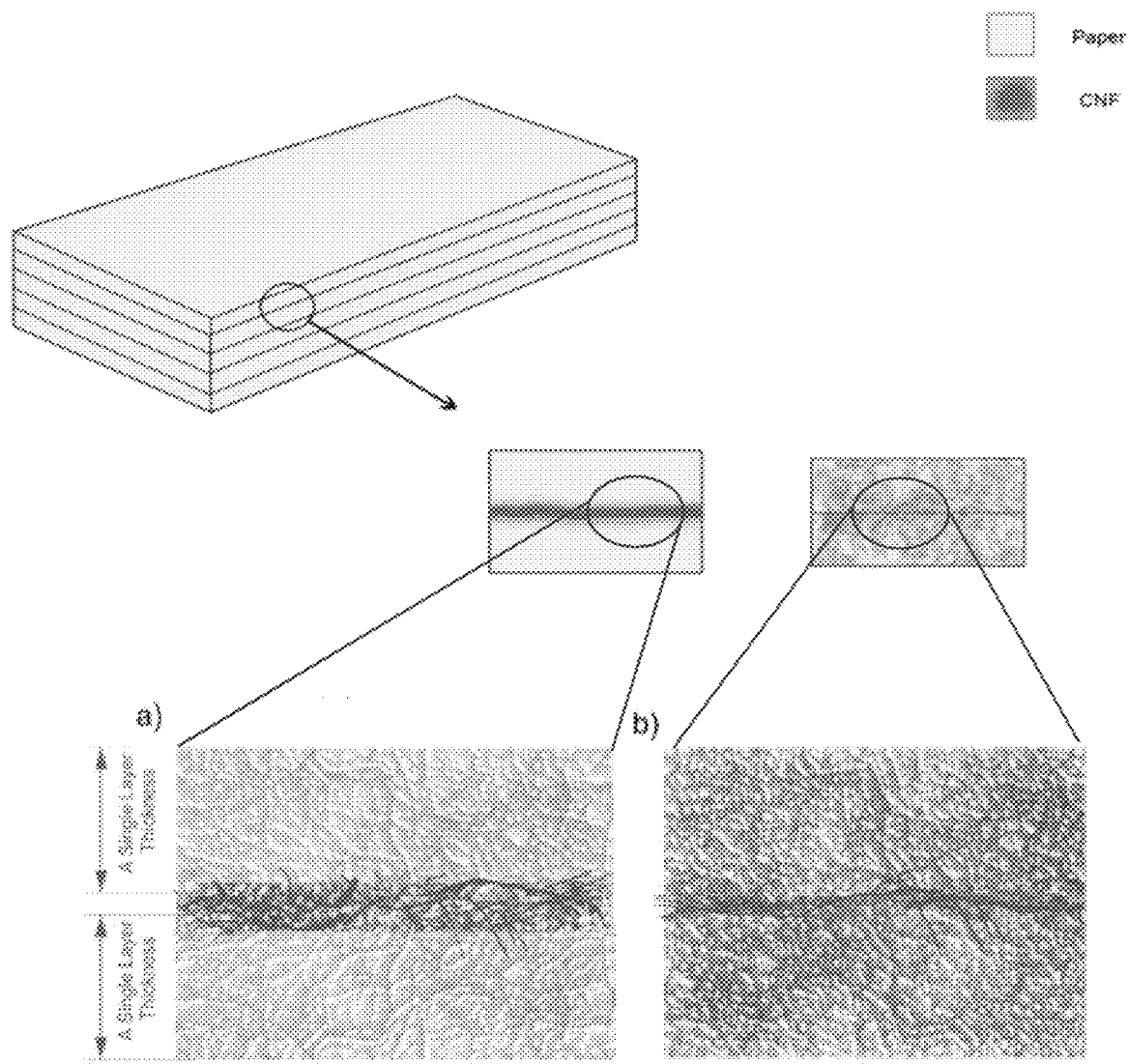
FIG. 2 illustrates the invention conceptually; with subpanel a) illustrating the expected result, and subpanel b) illustrating the obtained result.
Figure 3A:
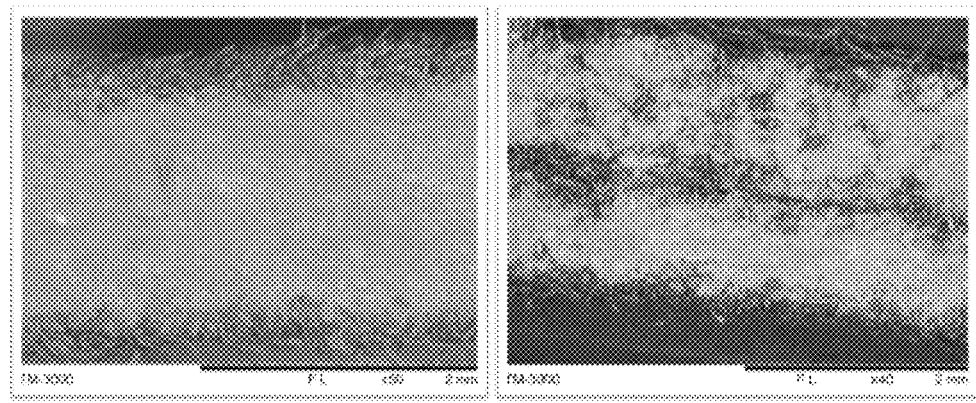
FIGS. 3A and 3B are SEM micrographs of early composite laminates made according to the invention under differing conditions.

Although cellulose nanofibers have been described in the literature as binders or adhesives in coatings, applicants have surprisingly found that under certain processing conditions, the cellulose nanofibers actually can impregnate the paper layers forming an essentially homogeneous composite layer. FIGS. 2 and 3 illustrate this conceptually. FIG. 2 illustrates a composite laminate and, in subpanel a) the expected laminate structure having two plies of paper (yellow) adhered by a binder layer of CNF (green). However, subpanel b) illustrates the actual composite material which is more homogeneous in that the CNF (green) impregnates into the paper ply layers (yellow) rather than being a border between plies. Sample #6 of FIG. 3A also shows this impregnation resulting in a more homogeneous middle layer. FIG. 3C also illustrates the many laminate plies or layers (red and blue lines) impregnated with the CNF (green) in an overlay over the SEM of sample #6 of FIG. 3A.

While the term "laminate" is sometimes used to describe the finished products of the invention herein, the term "composite" is perhaps a more accurate descriptor. "Laminates" gives historical recognition to the fact that the composites are assembled into a stack of layers or plies, but the hallmark of layers or striations parallel to the plies of laminates is substantially muted or absent in the final, compressed "composite" products.

Figure 6A:
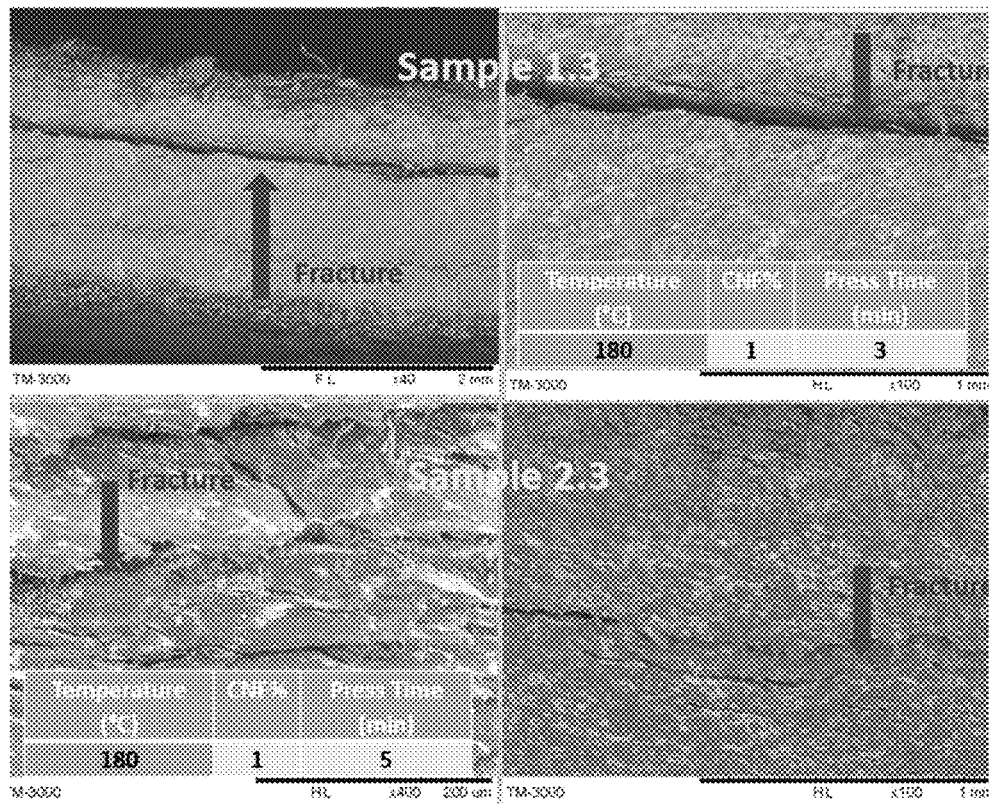
Figure 6B:
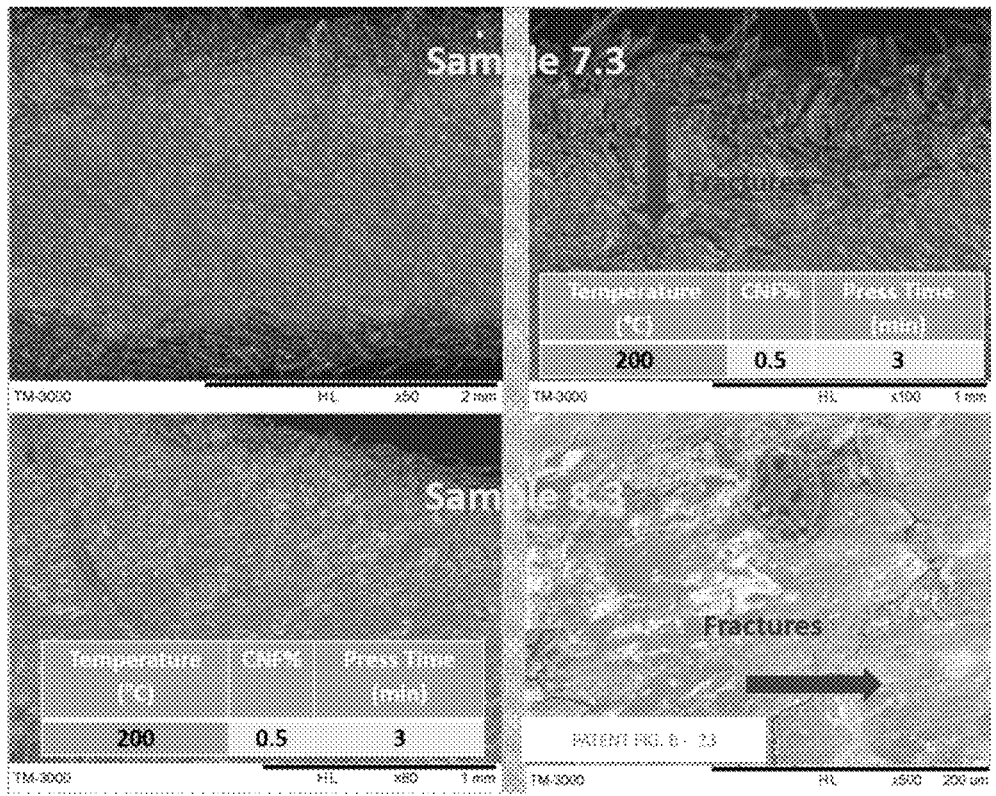

The homogeneity of the resulting composite was quite a surprising result. Applicants suspected the CNF would act as a binder or adhesive to hold the paper layers together. Instead, they discovered that the CNF impregnated the paper layers to produce a composite that does not show the striations expected of the multiple paper layers laminated together. Instead, the composite exhibits substantial homogeneity throughout its depth. "Substantial homogeneity" or "substantially homogeneous" as used herein refers to the absence of visible layering or striations in the composite product. Sample #6 of FIG. 3A, and FIG. 6B illustrates this with SEM photos of composite products made. The apparent lack of homogeneity at the upper and lower surfaces of some products (e.g. FIG. 3A, sample #6; and 6B, sample 7.3) results from the use of a wire screen to sandwich the laminate as described above. This feature of apparent top and bottom surface "layers" caused by the screen is not excluded by applicants' definition of "substantially homogeneous." It will be recalled that these samples contain 23 or 25 plies while the SEMs exhibit only an upper surface layer, a bottom surface layer and a larger central homogeneous area. This observation suggests another way—a quantitative way—to view "substantially homogeneous." One can define a ratio of the number of actual paper layers used to make the composite divided by the number of apparent layers visible in an SEM of the composite product. In the examples mentioned above, this ratio is about 8. However, the invention encompasses ratios (so-defined) of at least 2, at least 3, at least 5, at least 8, at least 10, and at least 15.

The composite products may be characterized as interlaminar reinforced paper laminates, where the CNF both reinforces and bonds the paper laminae or plies, resulting in impressive mechanical strength properties, especially for the more dense composite products. Many of these mechanical strength properties are discussed in the following examples. FIGS. 2b and 3C illustrate how CNF impregnates the paper and intermeshes with the fibers of the paper itself after being subjected to the compression and drying step according to the invention. In this manner it is thought to serve as both an adhesive and reinforcing element.

PRODUCT EXAMPLES AND PROPERTIES

Example 1

In a first trial, six composite samples were prepared in replicate under different conditions by the RRB method to form UD laminate systems. These samples ranged in density from a low of 1.07 g/cm$^3$ to a high of 1.25 g/cm$^3$. Sample #3 was made from 23 plies impregnated in a 1% CNF suspension and pressed 3 minutes at 200° C., whereas sample #6 was made from 23 plies impregnated in a 0.5% CNF and pressed for 5 minutes at 180° C. Three point bending tests were carried out on prepared specimens according to ASTM D-790 with a crosshead speed of 1.27 mm/min, and a span-to-thickness ratio of 20:1 on strips that measured 13×2×70 mm. Strain/stress plots were prepared for sample #3 and #6 replicates. Sample #3 showed maximum Modulus of Rupture (MOR), an alternative to flexural strength, of 40 MPa and a Modulus of Elasticity (MOE), an alternative to flexural modulus, of 4 GPa. Some of the sample #3 replicates showed some signs of delamination between 30 and 40 MPa. Sample #6, in contrast, showed maximum MOR of 95 MPa and a MOE of 8 GPa, and no signs of delamination.

Figure 3B:
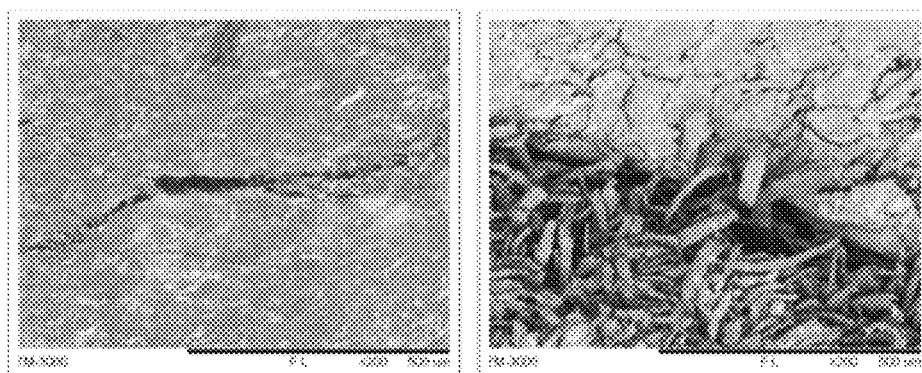
Figure 3C:
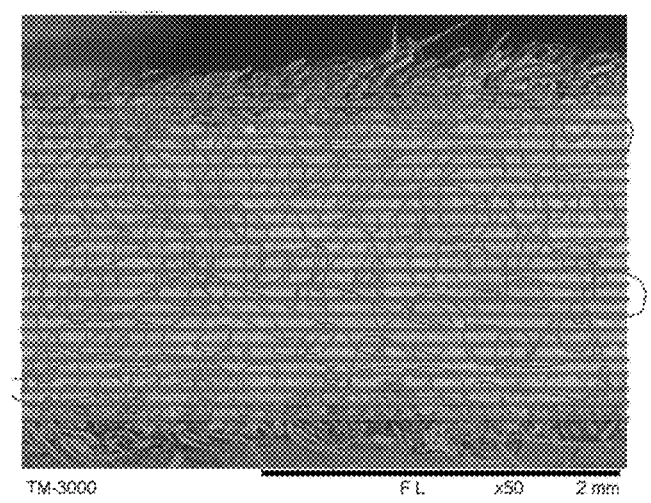
FIG. 3C overlays the SEM of FIG. 3A, sample #6, with a theoretical sketch of the laminate plies (red and blue lines) and impregnated CNF (green lines).

FIGS. 3A and 3B are SEMs of the same Samples #3 and #6 at two different magnifications. Delamination is quite visible in Sample 3, while Sample 6 demonstrates its substantial homogeneity. The delamination fracture of sample #3 in the three-point bending test suggests that lower CNF content (e.g. lower than 1%) may contribute to better distribution of nanofibrils into the laminate. The effect of the lower 0.5% CNF suspension vs a 1.0% suspension was shown in a subsequent experiment to be statistically significant in getting better penetration of the fibrils into the paper.

Example 2

Figure 4:
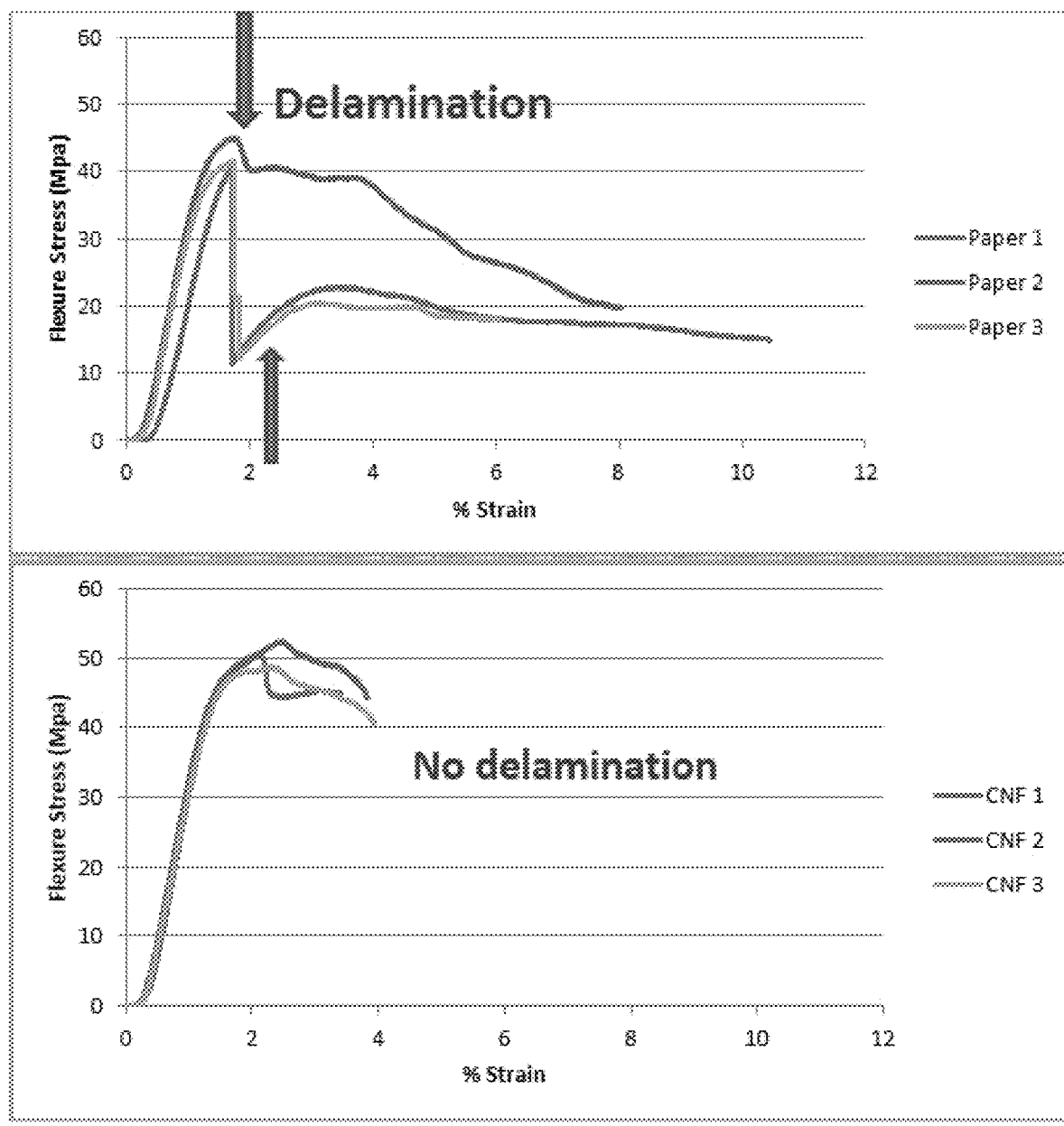
FIGS. 4 to 8 illustrate data from various experiments described later herein in connection with the examples.

In another example, six composites were prepared by CFT to form CD laminate stacks that were compressed at 1400 psi (9.6 MPa) at 180° C. for 5 minutes. Three experimental strips were soaked in 1% CNF solution for 1 minute and had a final density of 1.03 g/cm$^3$ and three control strips were soaked in water solution for 1 minute and had a final density of 0.98 g/cm$^3$. Three-point bending tests were performed as in Example 1. Again, delamination of the comparative paper samples occurred at about 40 MPa, whereas the 1% CNF experimental sample had a maximum Flexural Stress of about 50 MPa and no signs of delamination. These results are shown in FIG. 4.

Example 3

Nine 7×7 cm paper samples were soaked in a 1% CNF suspension for varying length of time to determine an optimal soak time for impregnation of CNF into the paper. The papers were weighed before and after soaking to determine weight gain and this was calculated as a percent of the initial paper weight. The results are shown in Table 3.1 below. Longer soaking times did not correlate to increased imbibing and impregnation with CNF, so shorter soak times of 1 minutes were selected for further experiments.

TABLE 3.1

| Sample # | Weight (g) | Soaking time (min) | Weight with CNF (g) | Absorbed CNF (g) | % dry CNF absorbed |
|---|---|---|---|---|---|
| 1 | 0.379 | 1 | 0.391 | 0.012 | 3.1 |
| 2 | 0.374 | 1 | 0.384 | 0.0097 | 2.5 |
| 3 | 0.3784 | 1 | 0.392 | 0.0136 | 3.6 |
| 4 | 0.3764 | 2 | 0.3848 | 0.0084 | 2.2 |
| 5 | 0.376 | 2 | 0.382 | 0.006 | 1.6 |
| 6 | 0.3689 | 2 | 0.377 | 0.0081 | 2.2 |
| 7 | 0.3745 | 3 | 0.382 | 0.0075 | 2.0 |
| 8 | 0.375 | 3 | 0.3838 | 0.0088 | 2.13 |
| 9 | 0.375 | 3 | 0.3776 | 0.0026 | 0.6 |

Example 4

Eight sets of five replicate composite stacks were prepared as in prior examples, using 25 plies folded in the CD direction. Four were soaked for 1 minute in 1% CNF and four were soaked in 0.5% CNF. The samples were compressed at 1400 psi (9.6 MPa) under varying time and temperature conditions at shown in Table 4.1 below.

TABLE 4.1

| Sample # | Temperature (° C.) | CNF (%) | Press Time (min) | Ex. 5 Sample Descriptor |
|---|---|---|---|---|
| 1 | 180 | 1 | 3 | 180-1-3 |
| 2 | 180 | 1 | 5 | 180-1-5 |
| 3 | 200 | 1 | 3 | 200-1-3 |
| 4 | 200 | 1 | 5 | 200-1-5 |
| 5 | 180 | 0.5 | 3 | 180-0.5-3 |
| 6 | 180 | 0.5 | 5 | 180-0.5-5 |
| 7 | 200 | 0.5 | 3 | 200-0.5-3 |
| 8 | 200 | 0.5 | 5 | 200-0.5-5 |

Figure 5A:
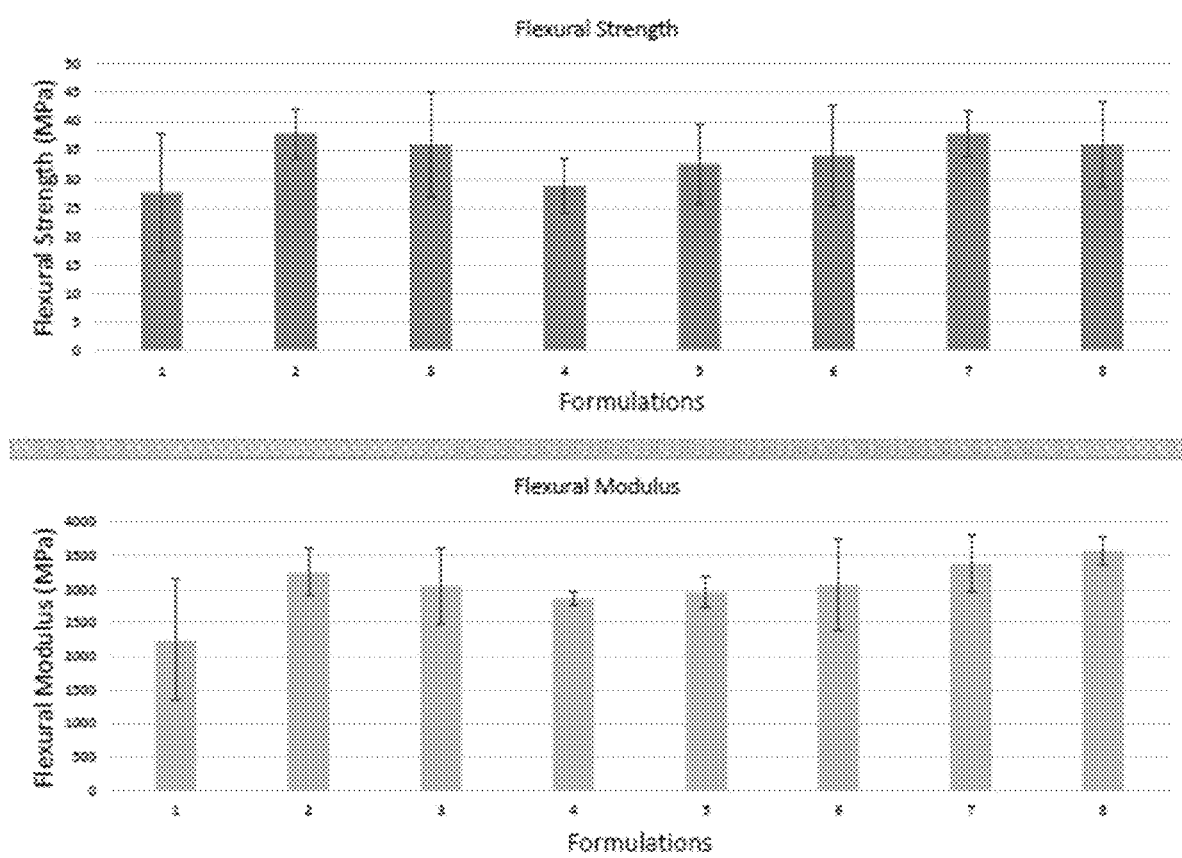

Three point bending tests were carried out on prepared specimens according to ASTM D-790 as in Example 1, to provide strain/stress plots from which Flexural Strength and Flexural Modulus were calculated. The average and ranges for these parameters are shown in FIG. 5A. SEMs appear to show that the concentrations of CNF (e.g. samples 7 and 8) produced more homogeneous central regions and fewer fractures under bending stress.

Figure 5B:
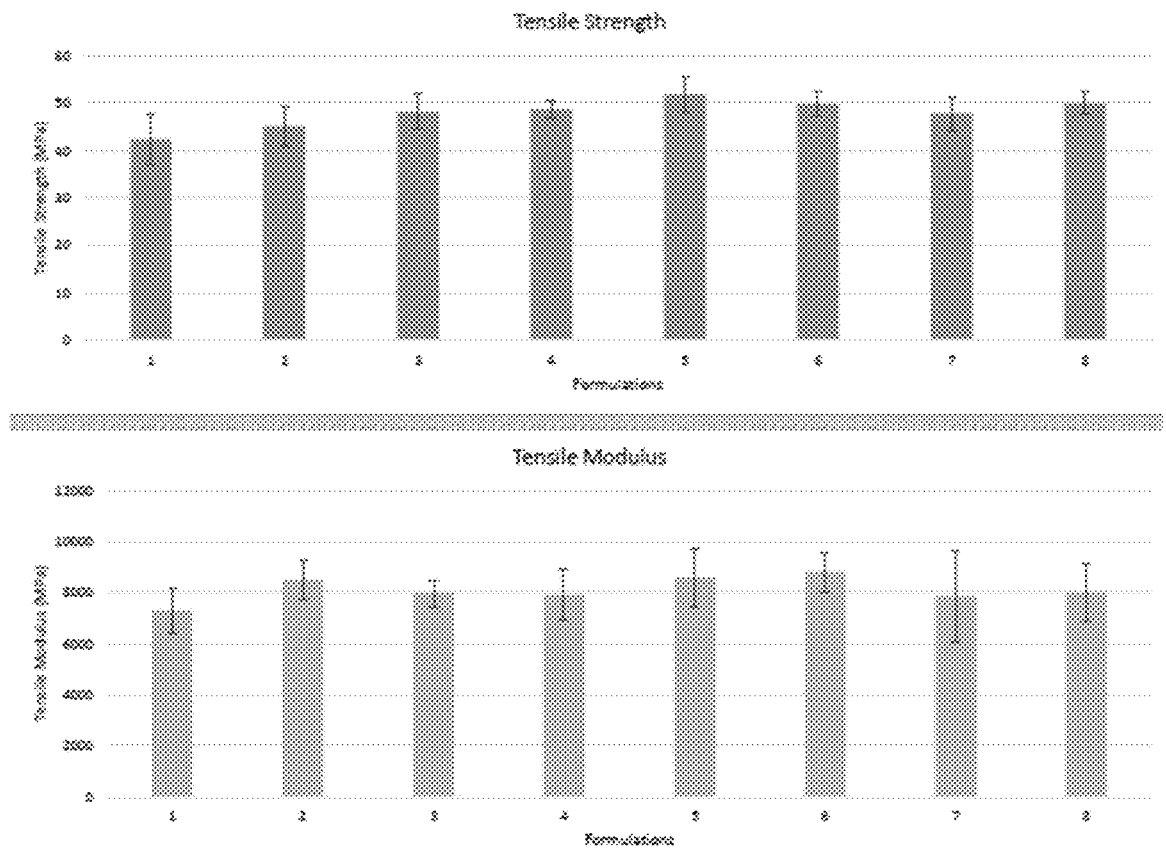
Figure 7:
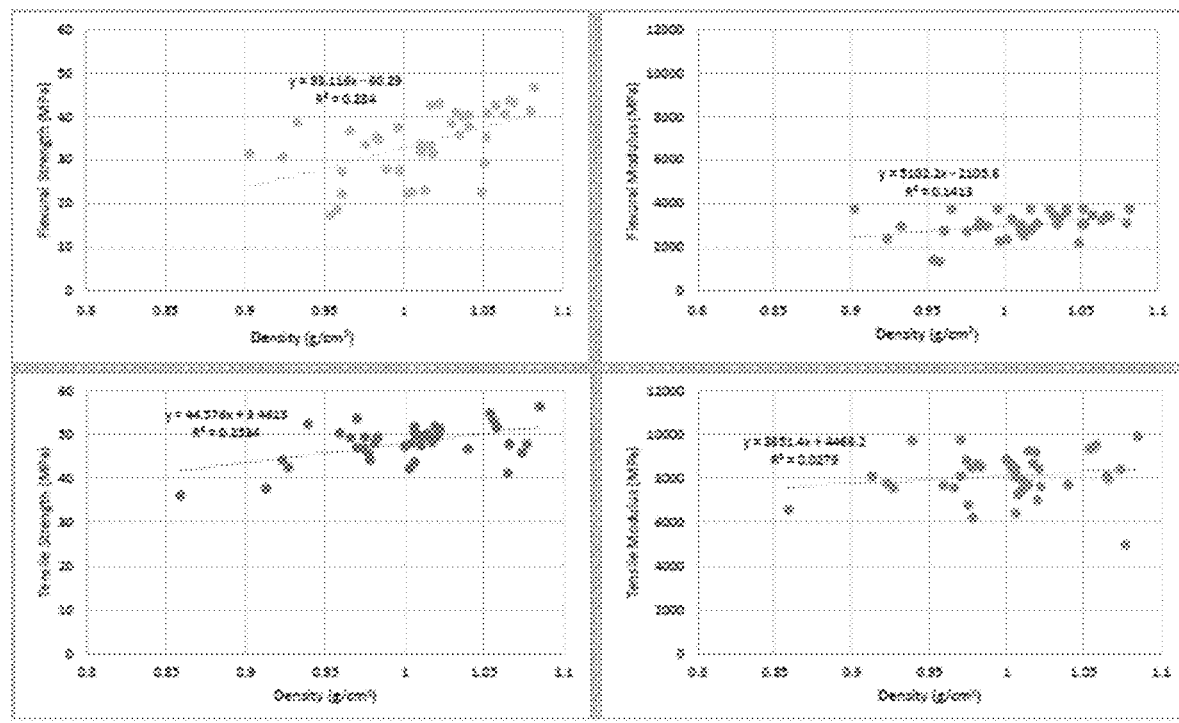

Tensile strength tests were also performed on these 13×2×70 mm strips in accordance with ASTM D368 at a crosshead speed of 5 mm/min on an Instron instrument. Strain/stress plots were prepared and Tensile Strength and Tensile Modulus were calculated. The average and range of these data are shown in FIG. 5B. The tensile properties of the CNF composites improved more than the flexural, but all the mechanical properties improved somewhat as composite density increased, as shown in FIG. 7. This effect was most pronounced with Flexural Strength.

SEMs were obtained on a Hitachi instrument for both the bending fractures (see, e.g. FIGS. 6A and 6B) and the tensile fractures (SEMs not shown, but incorporated from provisional) for further analysis. It can be observed in the SEMs that, with the possible exception of one sample (sample 1.3, FIG. 6A), the bending stress fractures tend to be randomly oriented. This further suggests the homogeneity of the composite products. Horizontal fractures (i.e. parallel to the plane of the laminates) tend to suggest delamination failures. This occurs when the layers separate one from another, i.e. when the intra-layer matrix bonds remain stronger than the inter-layer bonds. Non-horizontal fractures (i.e. not parallel to the plane of the composite laminates, (see, e.g. FIG. 6A, sample 2.3 and FIG. 6B, sample 8.3) tend to suggest paper matrix failures, rather than delaminations. This occurs when the intra-layer matrix bonds are weaker than any inter-layer bonds. When non-horizontal fractures extend a length that would have exceeded the thickness of a ply, it is evidence that multiple plies have merged to form a substantially homogeneous matrix.

Example 5

Figure 5C:
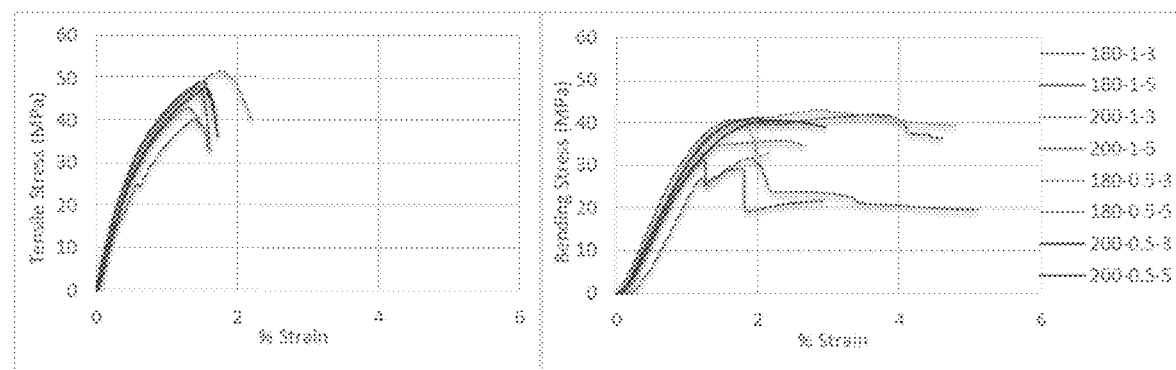

Eight samples were prepared consisting of 45 layers, each soaked 1 minute in 1% or 0.5% CNF suspension. Fifteen layers were assembled in a UD stack system. Three such UD systems are stacked in a CD manner at 0°, 90°, and 0°. The samples are compressed at 1400 psi (9.6 MPa) under varying times and temperatures just as in Example 4, Table 4.1, but the samples are given the "Ex. 5 Sample Designator" (at right), rather than the sample numbers 1 to 8. Four mechanical properties were measured for these 45-ply strips: three-point flexural bending strength (BS), bending elastic modulus (BM), tensile strength (TS) and tensile elastic modulus (TM). The flexural or bending stress and tensile plots for these 45-ply composites are shown in FIG. 5C, using Sample Descriptor. The average mechanical properties of these 3×15 layer composites are given in Table 5.1 below; the coefficient of variation is given in parentheses.

TABLE 5.1

| Sample Descriptor | BS (MPa) | BM (GPa) | TS (MPa) | TM (GPa) |
|---|---|---|---|---|
| 180-1-3 | 28 (35) | 2.3 (39) | 43 (12) | 7.3 (12) |
| 180-1-5 | 38 (10) | 3.3 (9) | 45 (9) | 8.5 (9) |
| 200-1-3 | 36 (25) | 3.1 (19) | 48 (7.5) | 8.0 (6) |
| 200-1-5 | 29 (17) | 2.9 (3.4) | 49 (3.5) | 8.0 (12) |
| 180-0.5-3 | 33 (21) | 3.0 (6) | 52 (7) | 8.6 (13) |
| 180-0.5-5 | 34 (26) | 3.1 (22) | 50 (5) | 8.9 (9) |
| 200-0.5-3 | 39 (10) | 3.4 (12) | 48 (7.5) | 7.8 (23) |
| 200-0.5-5 | 36 (19) | 3.6 (8) | 50 (5) | 8.0 (14) |

The literature was searched to determine comparable mechanical properties for other composite materials, in particular plastic resins like polypropylene with fibrous reinforcements. Table 5.2 shows some comparable mechanical properties of other materials, gathered from the literature.

TABLE 5.2

| Material | TS* (MPa) | TM* (GPa) | BS* (MPa) | BM* (GPa) |
|---|---|---|---|---|
| CNF/CopyPaper (this study) | 52 | 9.0 | 43 | 3.6 |
| KraftPaper/glue/JuteFiber (0.05 g)[47] | 43 | 1.8 | — | — |
| PP/Sisal 20%/MAPP[16] | 38 | 4.2 | 55 | 3.7 |
| PP/Nettle 20%[7] | 31 | 3.1 | 55 | 2.5 |
| PP/Coir 45%[10] | 48 | 1.0 | 51 | 1.1 |
| PP/CB[B] 10%[8] | 30 | 0.9 | — | — |
| PP/CopyPaper/MAPP[48] | 80 | 6.1 | — | — |
| PP/CopyPaper[48] | 64 | 5.3 | — | — |

TABLE 5.2-continued

| Material | TS* (MPa) | TM* (GPa) | BS* (MPa) | BM* (GPa) |
|---|---|---|---|---|
| Sodium Alginate-Film/CNF (10%)[49] | 30 | 1.4 | | |

References for Table 5.2 and subsequent discussion of properties comparison:
[7]Bajpai, P. K.; Singh, I.; Madaan, J., Comparative Studies of Mechanical and Morphological Properties of Polylactic Acid and Polypropylene Based Natural Fiber Composites. J. Reinf. Plast. Compos. 2012, 31 (24), 1712-1724.
[8]Luz, S.; Del Tio, J.; Rocha, G.; Gonçalves, A.; Del'Arco, A., Cellulose and Cellulignin from Sugarcane Bagasse Reinforced Polypropylene Composites: Effect of Acetylation on Mechanical and Thermal Properties. Composites Part A 2008, 39 (9), 1362-1369.
[10]Zaman, H. U.; Khan, M. A.; Khan, R. A., Comparative Experimental Measurements of Jute Fiber/Polypropylene and Coir Fiber/Polypropylene Composites as Ionizing Radiation. Polym. Compos. 2012, 33 (7), 1077-1084.
[16]Lavoine, N.; Desloges, I.; Dufresne, A.; Bras, J., Microfibrillated Cellulose - Its Barrier Properties and Applications in Cellulosic Materials: A Review. Carbohydr. Polym. 2012, 90 (2), 735-764.
[47]Verma, B. B., Continuous Jute Fibre Reinforced Laminated Paper Composite and Reinforcement-Fibre Free Paper Laminate. Bull. Mater. Sci. 2009, 32 (6), 589-595.
[48]Prambauer, M.; Paulik, C.; Burgstaller, C., Evaluation of the Interfacial Properties of Polypropylene Composite Laminates, Reinforced with Paper sheets. Composites Part A 2016, 88, 59-66.
[49]Deepa, B.; Abraham, E.; Pothan, L.; Cordeiro, N.; Faria, M.; Thomas, S., Biodegradable Nanocomposite Films Based on Sodium Alginate and Cellulose Nanofibrils. Materials 2016, 9 (1), 50.

Strength and stiffness properties of the composite laminates are comparable to properties of many natural fiber filled polypropylene (PP) composites[7,8,10], other paper based[47-48] and CNF based[49] laminates as presented in Table 5.2, with bending strength values slightly lower for our laminates. Also, the highest tensile strength value (52 MPa) was comparable to that of a 25% short glass fiber filled and a 25% short carbon fiber filled polypropylene composite (51 MPa and 58 MPa, respectively); maximum tensile modulus value (9.0 GPa) was slightly higher than short glass fiber filled PP (8.8 GPa) but much lower than short carbon fiber filled PP (~15.0 GPa) 50. While the polypropylene/copy paper system did have larger modulus, this product would not be considered "green" because of the source and disposal issues of polypropylene. In another study[47], continuous jute fibers were used to reinforce layers of thick unbleached Kraft paper and thin bleached Kraft paper, glued together with white corn flour glue. Maximum results showed tensile strength and normalized tensile modulus of 43 MPa and 1.2 GPa, respectively for thick unbleached Kraft paper. The tensile strength of 32 MPa and normalized tensile modulus of 1.8 GPa was reported for thin bleached Kraft paper. Both results were lower than the properties reported here.

Example 6

Figure 8:
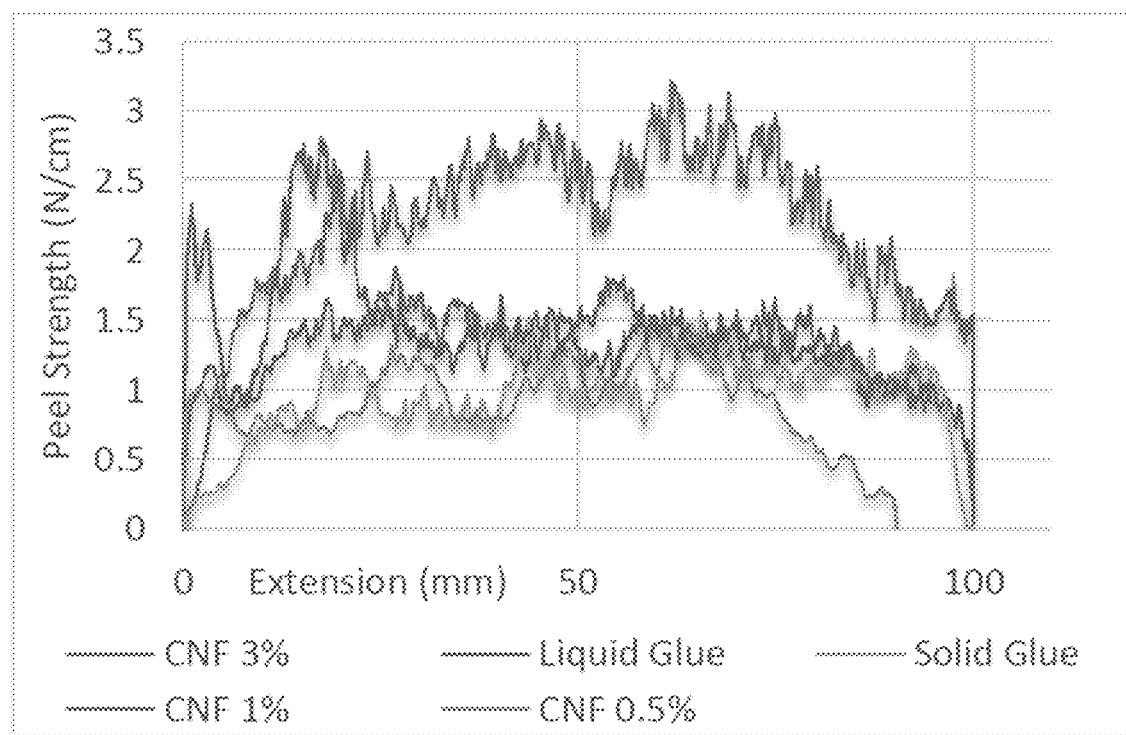

CNF bonding properties between two 15 cm paper strips were also tested and compared with several commercial adhesives in a 180° peeling test using an Instron 5966 instrument like that used for tensile testing, according to ASTM D1876-08. The cross head speed was 5 cm/min. For this experiment, two plies of copy grade paper were soaked in 0.5%, 1%, or 3% CNF suspensions for 1 min and placed under a 1.5 kg weight while air dried at room temperature. A 10 cm wide aluminum foil was inserted between the two strips at one end to leave the ends un-adhered for grasping in the instrument; leaving only 5 cm for bonding. These CNF strips were compared with controls of (1) a commercial solid glue, (2) a commercial liquid glue, both applied to the strip evenly by a glass slide, and (3) strips coated in water only, and otherwise treated in the same manner. The peeling test is a measure of adhesive strength. The load to peel the layers apart was recorded until the two strips separated, and then converted to a per unit width basis. The results of the test are shown in FIG. 8; peeling test curves for samples made with 0.5% (light blue), 1% CNF (purple), 3% CNF (dark blue), solid paper adhesive (green) and liquid paper adhesive (red).

Average peel strength values were 1.0, 1.7, and 2.2 N/cm for samples dipped into 0.5%, 1%, and 3% CNF suspensions, respectively. With increasing the amount of CNF in the suspension from 0.5% to 1% which is still a small proportion, the peel strength increased nearly twice as much. Without using CNF as a binder, control papers simply dipped in water showed no bonding strength at all, which confirms the bonding properties of CNF. The increasing trend in peel strength when CNF % is increased is in contrast with the results of mechanical testing, where lower properties were obtained at higher CNF contents. The difference in the nature of peeling test forces compared to bending test forces can explain this observation. The 180° peeling test exerts forces perpendicular to the adhesion plane, resulting in separation of the bonded layers in the z-direction, whereas in bending tests the interlaminar shear forces tend to act parallel to the adhesion plane.

The mechanism of peeling was different between the 0.5% CNF sample and those with 1% and 3% CNF. In the former case (0.5% CNF), the peeling was observed at the interface of the two bonded papers where the CNF was applied leaving two strips with similar thickness after the peeling was done. However, for samples with 1% and 3% CNF, peeling occurred within the bulk of one of the paper strips and not at the interface. This, along with data collected from the peeling test can be an indication of higher adhesion properties when higher concentrations of CNF are used. The high peel strengths achieved for the samples bonded with 1% and 3% CNF suspension (1.7 and 2.2 N/cm), show that the bonding strength of CNF could be even higher than commercial adhesives (0.9 and 1.4 N/cm for solid and liquid adhesive samples, respectively). This can be in part attributed to the reinforcing effect of CNF contributed to the z-direction tensile strength of paper.

The foregoing description of the various aspects and embodiments of the present invention has been presented for purposes of illustration and description. It is not intended to be exhaustive of all embodiments or to limit the invention to the specific aspects disclosed. Obvious modifications or variations are possible in light of the above teachings and such modifications and variations may well fall within the scope of the invention as determined by the appended claims when interpreted in accordance with the breadth to which they are fairly, legally and equitably entitled.

What is claimed is:

1. A composite cellulosic product comprising:
a plurality of unidirectional stack systems stacked in a cross-directional manner;
wherein each of the plurality of unidirectional stack systems comprises a plurality of layers of paper bonded together and reinforced by cellulose nanofibrils (CNF), wherein the CNF impregnates the paper layers and is distributed in a substantially homogeneous fashion; and
wherein the composite cellulosic product has a tensile strength of at least about 52 MPa and a tensile modulus of at least about 8.8 GPa.

2. The product of claim 1, wherein the composite cellulosic product comprises from about 1.0 wt/wt % to about 5.0 wt/wt % of dry CNF.

3. The product of claim 1, wherein the composite cellulosic product exhibits a density from about 0.90 g/cm$^3$ to about 1.3 g/cm$^3$.

4. The product of claim 1, wherein the composite cellulosic product has an improved mechanical property selected from flexural strength or tensile strength, compared to a similar laminated paper not impregnated with CNF.

5. The product of claim 4, wherein the composite cellulosic product has a flexural strength of at least about 38 MPa and a flexural modulus of at least about 3.6 GPa.

6. The product of claim 1, wherein the ratio of the number of layers of paper used to make the composite cellulosic product divided by the number of apparent layers visible in an SEM of the composite cellulosic product is at least 4.

7. The product of claim 1, wherein composite cellulosic product consists only of layers of paper, CNF, and water.

8. The product of claim 6, wherein the composite cellulosic product exhibits a density from about 0.90 $g/cm^3$ to about 1.3 $g/cm^3$, and the composite cellulosic product consists only of layers of paper, CNF, and water.

9. An interlaminar reinforced paper laminate, comprising:
a plurality of unidirectional stack systems stacked in a cross-directional manner;
wherein each of the plurality of unidirectional stack systems comprises a plurality of layers of paper bonded together and reinforced by cellulose nanofibrils (CNF), where the CNF both reinforces the paper layers and bonds the layers together, forming a substantially homogeneous composite product; and
wherein the composite cellulosic product has a tensile strength of at least about 52 MPa and a tensile modulus of at least about 8.8 GPa.

10. The interlaminar reinforced paper laminate of claim 9, consisting essentially of only a plurality of layers of paper and cellulose nanofibrils (CNF).

11. The product of claim 1, wherein the composite cellulosic product exhibits a density of from about 0.9 $g/cm^3$ to about 1.03 $g/cm^3$.

12. The composite cellulosic product of claim 1, wherein the composite cellulosic product is made by a process comprising contacting paper with a slurry containing CNF for a time sufficient to coat or impregnate the paper with the CNF in the slurry, layering up the plurality of unidirectional stack systems in a cross directional manner to form a layer stack, and subjecting the layer stack to a pressure and heat treatment to compress and dry the layer stack into a composite cellulosic product.

13. The interlaminar reinforced paper laminate of claim 9, wherein the interlaminar reinforced paper laminate is made by a process comprising contacting paper with a slurry containing CNF for a time sufficient to coat or impregnate the paper with the CNF in the slurry, layering up the plurality of unidirectional stack systems in a cross directional manner to form a layer stack, and subjecting the layer stack to a pressure and heat treatment to compress and dry the layer stack into an interlaminar reinforced paper laminate.

* * * * *